2 Sheets--Sheet 1.

C. W. SALADEE.

Pleasure Vehicles.

No. 5,787. Reissued March 10, 1874.

Witnesses

James McBride

Francis Forrance

Inventor.

Cyrus W. Saladee

AM. PHOTO-LITHOGRAPHIC Co. N. Y. (OSBORNE'S PROCESS.)

2 Sheets--Sheet 2.

C. W. SALADEE.

Pleasure Vehicles.

No. 5,787. Reissued March 10, 1874.

*Witnesses.*

James McBride
Francis Torrance

*Inventor.*

Cyrus W. Saladee

AM. PHOTO-LITHOGRAPHIC Co. N. Y. (OSBORNE'S PROCESS.)

UNITED STATES PATENT OFFICE.

CYRUS W. SALADEE, OF PITTSBURG, PENNSYLVANIA.

IMPROVEMENT IN PLEASURE-VEHICLES.

Specification forming part of Letters Patent No. 134,004, dated December 17, 1872; reissue No. 5,787, dated March 10, 1874; application filed February 6, 1874.

*To all whom it may concern:*

Be it known that I, CYRUS W. SALADEE, of Pittsburg, in the State of Pennsylvania, have invented certain Improvements in Pleasure-Vehicles, of which the following is a specification embodying my invention:

The first part of my invention relates to the peculiar construction of a slatted frame-work to take the place of a body, in combination with side springs of buggies. The second part of my invention relates to the construction of a "foot-box" or bottom part of a body, and the same suspended between the side springs of buggies independently of the seat, while the latter is supported upon the center of the springs independently of the foot-box; and the third part of my invention relates to a peculiar method of suspending carriage-bodies between the side springs—the second and third parts of my invention being simply different modifications based upon the principle of the first; and, finally, the peculiar combination of the complete vehicle.

Figure 1:
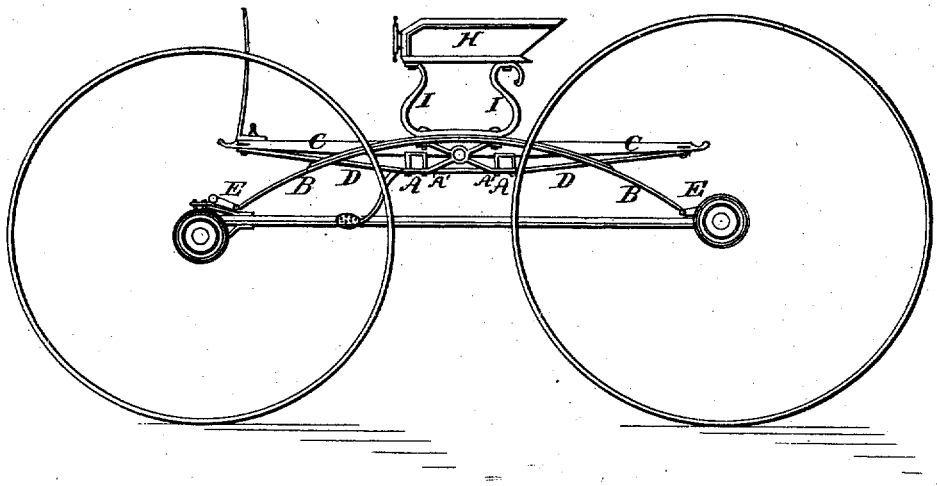
Figure 2:
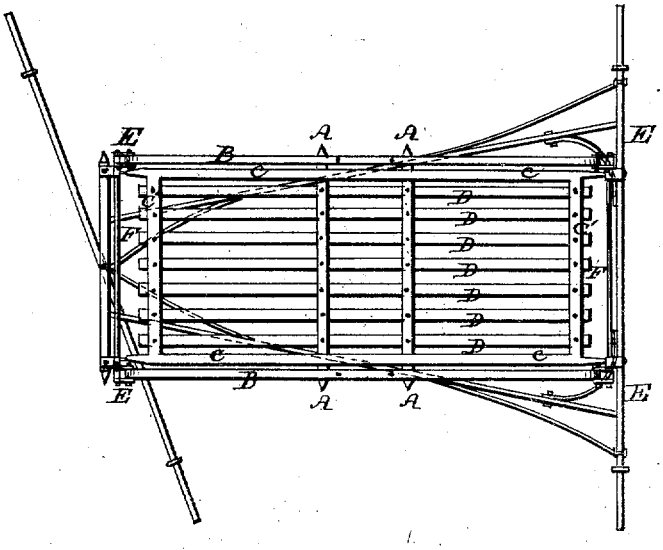
Figure 3:
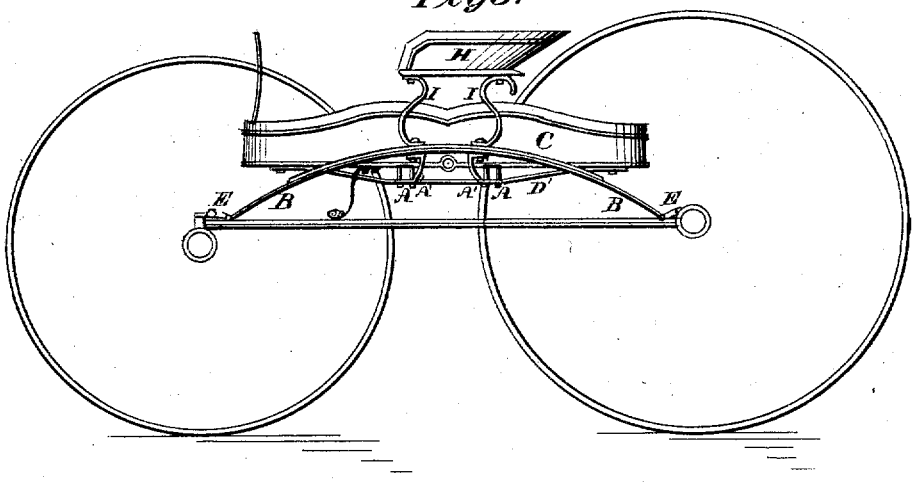
Figure 4:
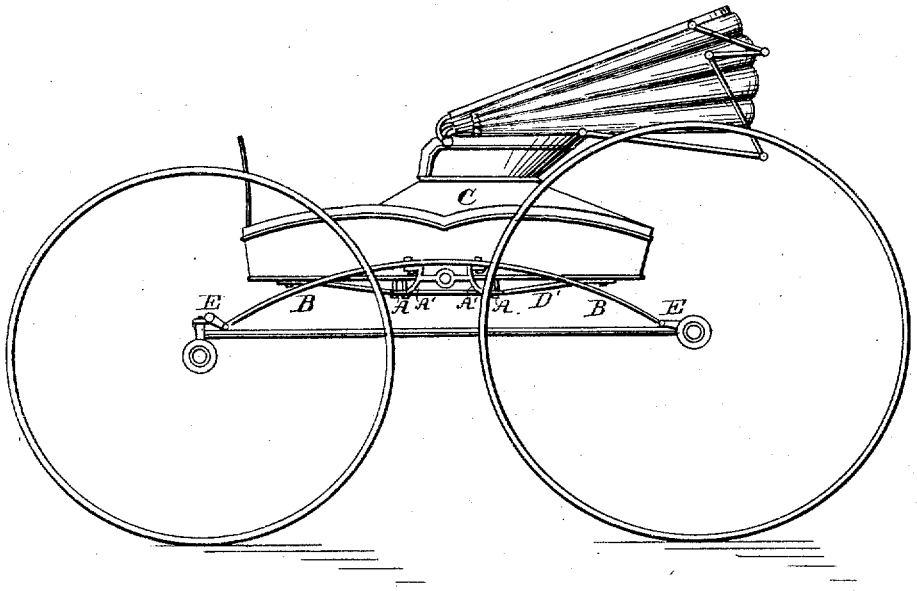

In the drawing, Figure 1 is a side elevation of a complete "road-wagon," with a slatted frame-work, C, C′, D, and A A, suspended between the springs B and B, while the seat H is mounted upon the iron bearings I I, resting directly on the top of the springs. Fig. 2 is a top or plan view of the same with the seat removed. Fig. 3 is also a side elevation of a light road-wagon, and is the same as Fig. 1, except in this modification a foot-box, C, is substituted for the slatted frame C. (Seen in Fig. 1.) Fig. 4 is another side elevation, with the same arrangement of springs and gearing as in the other figures, but having a body with seat attached suspended between the springs.

The running-gear of these buggies is constructed in any of the well-known styles adapted to side springs, and with a connecting-rod, F, Fig. 2, secured to the hind axle and front bolster, having links E on the outer ends, which receive the ends of the springs, upon either of the modifications of links and connecting-rods previously patented by me or now in use.

For the first modification of my invention, as seen in Figs. 1 and 2, I construct a frame, about two feet wide by four feet long, of two side pieces, C, and end pieces C′. These side pieces C are made to rest upon one or two cross-bars, A A. The space between the side pieces C C is filled up by narrow slats D, having proportionate spaces between the slats, and which are firmly secured to the under side of the end cross-pieces C′ of the frame and the cross-bars A A. A wrought or malleable cast "hanger," A′ A′, Fig. 1, is secured to the under side of the springs, and which take hold of the extended ends of the cross-bars A A, and thus suspends the slatted frame between the two side springs B and B, as clearly seen in Figs. 1 and 2. On the top of the springs is placed the seat-bearing I I by means of two bolts passing through the spring and the upper feet of the hanger A′, or by clips, and the whole is firmly held together at this point, while, with the seat H mounted in position on the bearings I I, the buggy is complete.

The great advantage of suspending the slatted frame C D or body C between the springs B and B is that I can place the body at as low a point as may be desired for convenience of getting in and out—an important advantage, which cannot be attained under the present method of bolting the body on the top of the springs.

For the second modification of my invention, I make a foot-box, C, Fig. 3, about the same width and length of the slatted frame C in Fig. 1, and suspend it between the springs, the same as in the first modification, while the seat is supported exactly the same as in Fig. 1. This foot-box C, Fig. 3, has a closed bottom, for carrying packages, &c. This modification, by reason of the raised sides and ends of the box, is preferable to the other modification; besides, it gives a more finished appearance to the complete vehicle.

For the third modification, I use the same arrangement of gearing, hangers A′, and cross-bars A and A, as shown in the other two modifications, and in like manner suspend a complete body and seat, of any desired and appropriate style, upon the cross-bars A A, and between the springs B and B. The seat in this case being a part of the body C, the iron seat-bearings I I are, of course, dispensed with. If preferable, the cross-bars A A may be dispensed with in either of the last two modifications, and the hangers A′ so formed and shaped at their lower extremities as to bend inward and take hold of the bottom of the foot-box or body by suitable fastenings; but in either of the before-described modifications, where the cross-bars A A are used, an under brace, D′, (seen in Figs. 3 and 4,) is secured to the under side of the bars, the ends of the under brace extending out and up against the bottom of the frame, box, or body, which serves to brace the ends of the body against the load that may be resting upon either end, as when a person is standing up in front of the seat.

It is not an absolute requirement, in the first and second modifications described, that the seat-bearings I I be secured directly upon the springs, as shown in the drawing, for in all cases where it is preferred the seat-bearings may rest in the first modification upon the side bars C of the slatted frame, and in the second modification described they may rest immediately outside of the foot-box upon the cross-bars A A, and in either case effect the same purpose as if applied as shown in the drawing.

I will further state that, as an equivalent substitute for the hangers A′, I can use a straight bolt or clip, passing down through or over the spring and the cross-bars A A, with an intermediate block or blocks between the cross-bars A A and the under side of the springs B B, which I shall employ by way of variety of style for this connection; and, in case I want to carry the body at as high a point as possible, I shall, in that case, bolt or clip the cross-bars A and A directly to the springs, dispensing with hangers or other intermediate parts.

I claim as my invention—

1. The slatted frame C, C′, and D, suspended by one or more cross-bars, A, or their equivalents, as described, substantially as set forth.

2. The slatted frame, foot-box, or body C, suspended between the side springs, and in combination with the cross-bars A and A, springs B and B, and connecting-rods F and F, substantially as and for the purpose set forth.

3. The suspended slatted frame C, C′, and D, in combination with the seat H, seat-bearings I I, and springs B and B, as and for the purpose set forth.

4. The foot-box C, suspended upon the springs B between the opposite seat-bearings I I, and in combination with the seat H, substantially as and for the purpose set forth.

CYRUS W. SALADEE.

Witnesses:

A. M. LEO,

G. B. SALADEE.